US011406196B2

(12) United States Patent
Canfield et al.

(10) Patent No.: US 11,406,196 B2
(45) Date of Patent: Aug. 9, 2022

(54) MULTI-FACTOR AUTHENTICATION WITH INCREASED SECURITY

(71) Applicant: Traitware, Inc., Reno, NV (US)

(72) Inventors: Christopher M. Canfield, Santa Clarita, CA (US); Herbert W. Spencer, III, Grass Valley, CA (US); Andrew Heath Spencer, Truckee, CA (US); Todd S. Hickerson, Colorado Springs, CA (US)

(73) Assignee: Traitware, Inc., Nevada City, CA (US)

( * ) Notice: Subject to any disclaimer, the term of this patent is extended or adjusted under 35 U.S.C. 154(b) by 0 days.

(21) Appl. No.: 15/429,098

(22) Filed: Feb. 9, 2017

(65) Prior Publication Data

US 2017/0230357 A1    Aug. 10, 2017

Related U.S. Application Data

(60) Provisional application No. 62/293,137, filed on Feb. 9, 2016.

(51) Int. Cl.
| | |
|---|---|
| *G06F 21/45* | (2013.01) |
| *G06F 21/44* | (2013.01) |
| *G06F 21/30* | (2013.01) |
| *G06F 21/00* | (2013.01) |
| *H04L 9/40* | (2022.01) |
| *H04W 12/06* | (2021.01) |
| *G06F 21/31* | (2013.01) |

(Continued)

(52) U.S. Cl.
CPC ............ *A47C 20/041* (2013.01); *A61G 7/015* (2013.01); *A61G 7/018* (2013.01); *A61G 7/07* (2013.01); *G06F 21/00* (2013.01); *G06F 21/30* (2013.01); *G06F 21/31* (2013.01); *G06F 21/44* (2013.01); *G06F 21/45* (2013.01); *H04L 63/0876* (2013.01); *H04W 12/06* (2013.01); *H04L 29/06755* (2013.01); *H04L 2463/082* (2013.01)

(58) Field of Classification Search
CPC ........... H04L 2463/082; H04L 63/0861; H04L 63/08; H04L 63/102; H04L 63/083; H04L 63/0853; H04L 63/0876; H04L 29/06755; H04L 9/40; H04W 12/06; A61G 7/015; A61G 7/018; A61G 7/07; A47C 20/041; G06F 21/00; G06F 21/30; G06F 21/44; G06F 21/45; G06F 21/31
USPC .......................................................... 727/7
See application file for complete search history.

(56) References Cited

U.S. PATENT DOCUMENTS

| | | | | |
|---|---|---|---|---|
| 6,047,281 A | * | 4/2000 | Wilson ............... | G06F 17/30327 |
| 8,190,129 B2 | * | 5/2012 | Ben Ayed ............... | G06F 21/32 |
| | | | | 455/410 |

(Continued)

*Primary Examiner* — Theodore C Parsons
*Assistant Examiner* — Howard H. Louie
(74) *Attorney, Agent, or Firm* — Fox Rothschild LLP; Kari L. Barnes

(57) ABSTRACT

A multi-factor authentication method and system is provided such that a push notification during an authentication process is only received if a mobile device and user are authenticated prior to receiving the push notification. Either the mobile device itself or a second device sending the push notification may be programmed to either reject or not forward the authentication request. Additionally, using the method of the present invention, enhanced security is provided by requiring the location of the mobile device and the second device to be approximately in the same geographical location.

20 Claims, 2 Drawing Sheets

(51) Int. Cl.
  *A47C 20/04*   (2006.01)
  *A61G 7/015*   (2006.01)
  *A61G 7/018*   (2006.01)
  *A61G 7/07*    (2006.01)

(56) References Cited

U.S. PATENT DOCUMENTS

| | | | |
|---|---|---|---|
| 8,739,260 B1* | 5/2014 | Damm-Goossens | H04W 12/06 726/4 |
| 2007/0042755 A1* | 2/2007 | Singhal | G06F 21/313 455/411 |
| 2013/0174252 A1* | 7/2013 | Weber | H04W 12/50 726/20 |
| 2015/0046989 A1* | 2/2015 | Oberheide | G06F 21/44 726/6 |
| 2016/0219039 A1* | 7/2016 | Houthooft | H04L 9/3215 |
| 2016/0277439 A1* | 9/2016 | Rotter | H04L 63/0861 |
| 2016/0337344 A1* | 11/2016 | Johansson | H04L 63/0838 |
| 2017/0201383 A1* | 7/2017 | Kim | H04L 9/3263 |
| 2017/0206525 A1* | 7/2017 | Sylvain | G06Q 20/405 |
| 2017/0220785 A1* | 8/2017 | Krishnamurthi | G06F 21/31 |
| 2017/0257363 A1* | 9/2017 | Franke | H04L 63/0853 |
| 2017/0270726 A1* | 9/2017 | Fisher | G07C 9/00174 |
| 2017/0279795 A1* | 9/2017 | Redberg | H04L 63/0838 |
| 2017/0302659 A1* | 10/2017 | Shteingart | H04L 63/0853 |
| 2017/0374070 A1* | 12/2017 | Shah | H04L 63/0884 |
| 2018/0034859 A1* | 2/2018 | Aronowitz | H04L 63/205 |
| 2018/0047233 A1* | 2/2018 | Fisher | G07C 9/00309 |
| 2018/0091493 A1* | 3/2018 | Raounak | H04W 4/029 |
| 2018/0097787 A1* | 4/2018 | Murthy | H04L 63/08 |
| 2018/0097788 A1* | 4/2018 | Murthy | H04L 63/08 |
| 2020/0279255 A1* | 9/2020 | Douglas | G06Q 20/18 |

\* cited by examiner

MULTI-FACTOR AUTHENTICATION WITH INCREASED SECURITY

CROSS-REFERENCE TO RELATED APPLICATION

The present disclosure claims priority to U.S. Provisional Patent Application Ser. No. 62/293,137, filed on Feb. 9, 2016, entitled "Multi-Factor Authentication with Increased Security" the entirety of which is incorporated herein by reference.

TECHNICAL FIELD

The present invention relates generally to authenticating individuals using identity credentials, and more particularly, to a method and system for confirming the identity of a user in possession of a device.

BACKGROUND

Computer systems, particularly those used on the internet are being used for transactions and information exchange that need to be secure so the that only authorized users can access the information or execute a transaction. Traditionally, usernames and passwords are used to provide security. It is known that 70% or more of data breaches are related to the use of usernames and their associated password. Most of the problems come from human error though systems are continually under attack from computer bots that are programmed to guess and repeatedly try usernames and passwords to break into the system, particularly at the root level. This has forced the use of long, complicated and difficult to remember passwords that add to the human failures. Multi-factor authentication, where something you have is used with something you know or something you are, are used in combination to secure access to systems and execution of transaction.

The advent of fingerprint readers on mobile devices and the prevalence of smart mobile devices has made it feasible to use a mobile device as something you have and a fingerprint as something you are. There are other obvious combinations. There are several prior art pending patent applications covering various combinations and methods incorporating this technique. In one such method a user when logging in to a terminal or personal computer (PC) either with a username or username and password, a push is sent to a preregistered mobile device. This authentication method is referred to as the tap-to-login process.

More specifically, in current push procedures, users sign in on the PC and then receive a push notification to their mobile device wherein the mobile device and the user are authenticated through various means. The device is verified through a digital signature as is known in the prior art and users are identified by means such as verification of a finger print, voice print or something the user knows, such as picture sequence.

Therefore, there is a need for reducing human failure issues with the tap to login procedure, reducing issue with timeouts and use of server resource and making attacks by trying multiple usernames or even knowing a username less likely to result in a data breach. The present invention solves this and many other problems in a unique and novel manner.

SUMMARY

A multi-factor authentication method and system is provided such that a push notification during an authentication process is only received if a mobile device and user are authenticated prior to receiving the push notification. Either the mobile device itself or a second device sending the push notification may be programmed to either reject or not forward the authentication request. Additionally, using the method of the present invention, enhanced security is provided by requiring the location of the mobile device and the second device to be approximately in the same geographical location.

In another preferred embodiment, when the mobile device authentication application is open and requests from two PCs or computer terminals are received from different devices, or location data access or transactions are blocked and user is required to re-authenticate. This prevents an unauthorized user from tailgating, that is trying to gain access or execute a transaction when an authorized user is in the process of authenticating.

It should be understood that the following detailed description and specific examples, while indicating the preferred embodiment of the invention, are intended for purposes of illustration only and are not intended to limit the scope of the invention.

DETAILED DESCRIPTION

Figure 1:
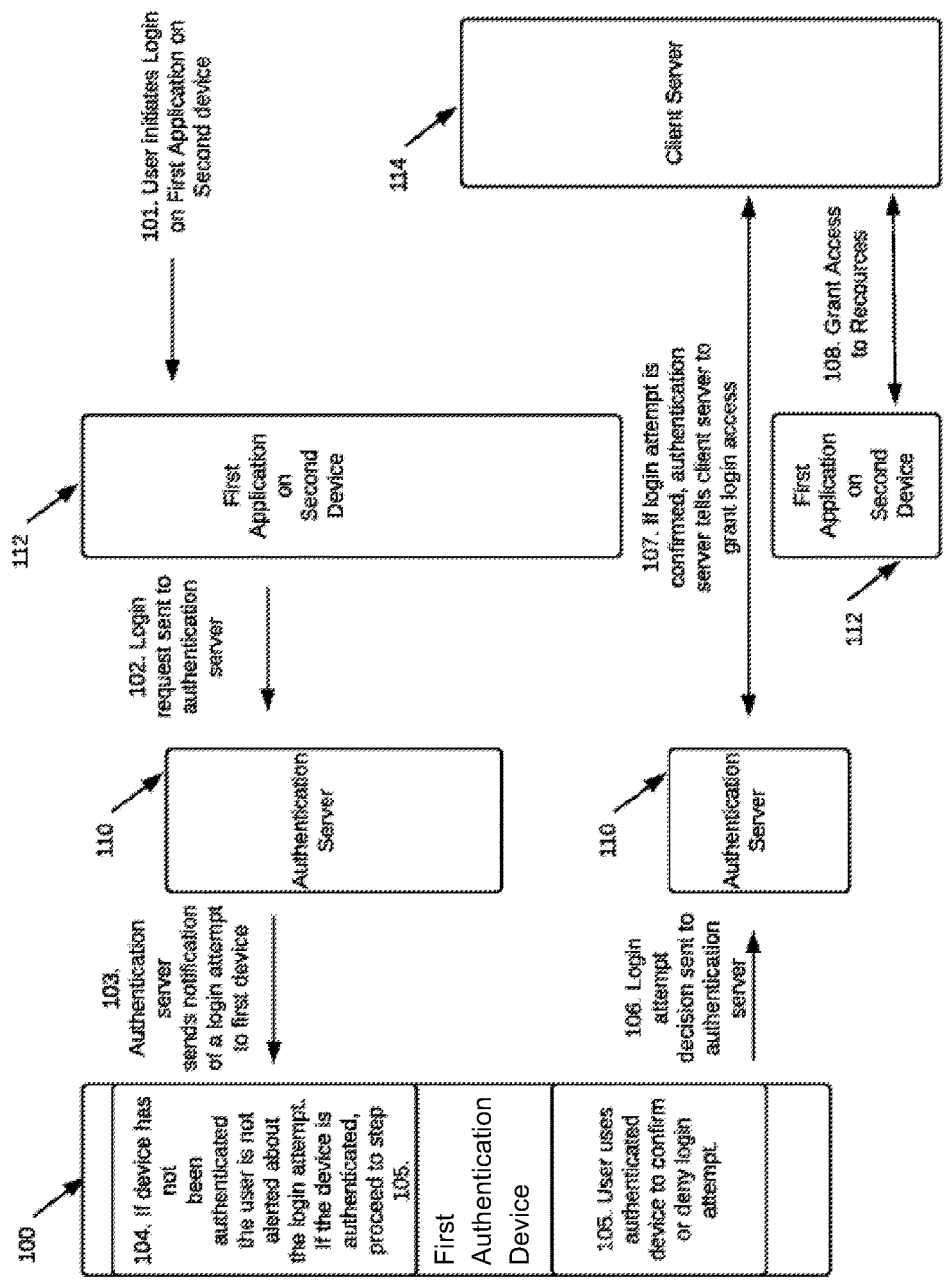
FIG. 1—depicts a login request confirmation where a first device must be authenticated before it will allow a user to receive notice of the login request or respond to that request.

Referring now to FIG. 1 a user initiates a login request 101 on a first application of a second device 112. The application may be a web-based application, an application local to a workstation, the workstation operating system itself, or any other type of application requiring a login. The login request is sent 102 to an authentication server 110. The authentication server 110 sends a notification of a login attempt 103 to a first device 100. If the device 100 has not been authenticated 104, then the user is not alerted to about the login attempt and the device cannot be used to accept or decline the login attempt. If the device 100 has been authenticated, the user is able to confirm or deny a login attempt 105. The login attempt decision is then sent 106 to an authentication server 110. If the login attempt is confirmed by the user of the first device 100, the authentication server 110 sends a request 107 to the client server 114 to grant login access 108 to the application on the second device 112.

Figure 2:
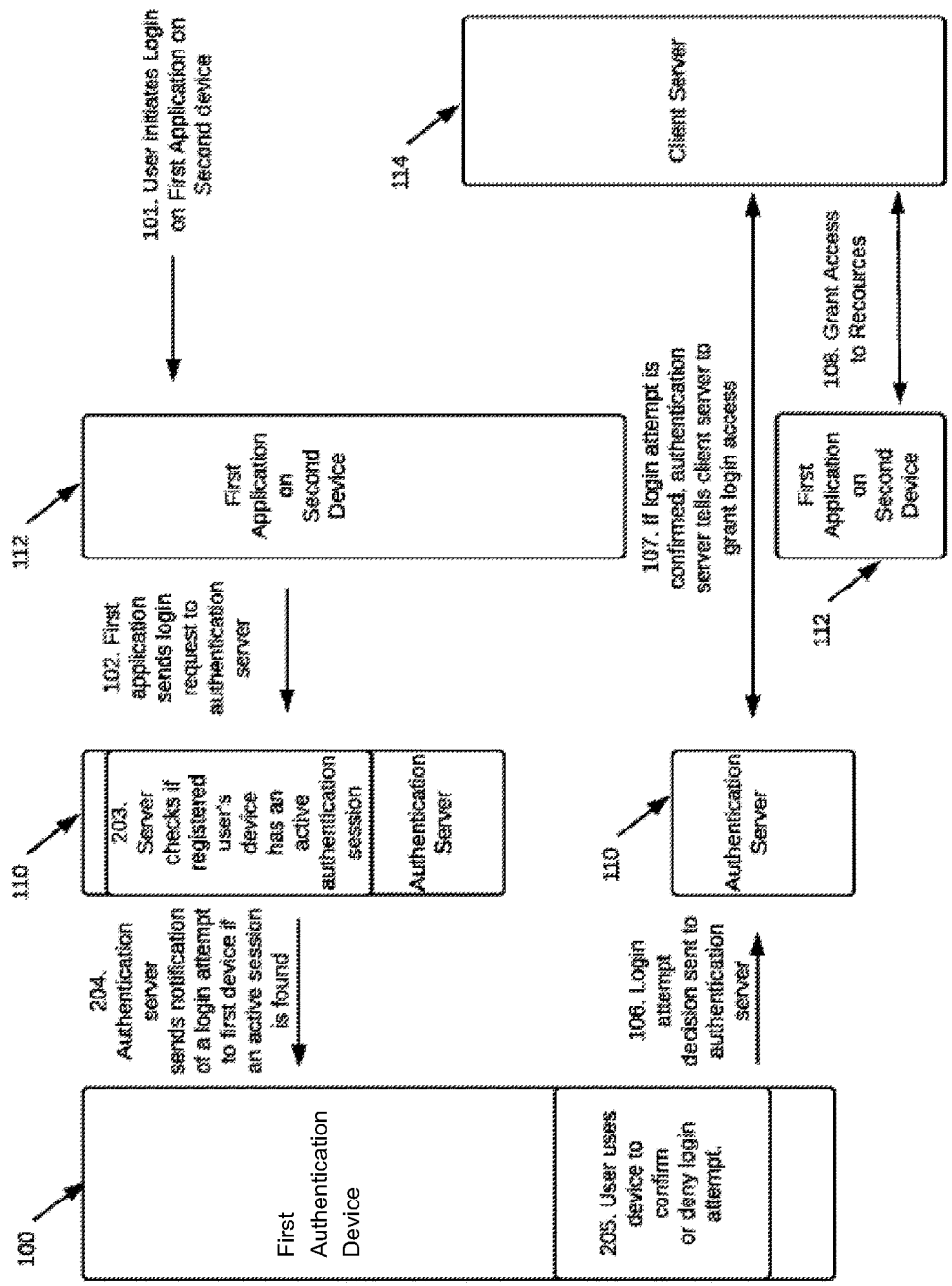
FIG. 2—depicts a login request confirmation where a first authentication device must have an active authentication session on an authentication server before the authentication server sends a login notification to the first device.

Referring now to FIG. 2, a user initiates a login request 101 on a first application of a second device 112. The application may be a web-based application, an application local to a workstation, the workstation operating system itself, or any other type of application requiring a login. The login request is sent 102 to an authentication server 110. The authentication server 110 checks if the person making a login request has a registered first authentication device 100 with an active authentication session 203. If there is an active authentication session associated with the first device, the authentication server 110 sends a notification of a login attempt 204 to a first device 100. The user is then able to confirm or deny a login attempt 205 on the first authentication device. The login attempt decision is then sent 106 to an authentication server 110. If the user of the first device 100 confirms the login attempt, the authentication server 110 sends a request 107 to the client server 114 to grant login access 108 to the application on the second device 112.

It should be understood, that there are several advantages to the above described procedures illustrated in FIGS. 1 and 2. One is if someone accidentally or for nefarious reasons intentionally attempts to login with the authorized user credentials. The authorized user does not receive notifications that the user has not intended. Further, it reduces significantly the risk that a user would accidentally authorize access by accepting a request that the user did not initiate. Secondly, it reduces the time that server resources are used waiting for user response. In some cases, it allows multi-factor authentication with systems that would time out waiting on a user response, as only a single or at most two clicks by the user are needed when a verification screen is used to allow the process to proceed.

In another preferred embodiment, a first device that has been previously registered with an authentication server can be used to confirm or deny a login attempt on a second device. An example would be using a mobile device to confirm a login attempt on a PC. A person authenticates the first device, initiates a login session on a second device, and then receives a notification on the first device asking them to confirm or deny the login request being made on the second device. If the user has not authenticated the first device before the initiation of the login request on the second device, the first device is not able to confirm or deny the login request. In order for the login request to be received by the first device, the first device must have an active authentication session.

An active authentication session may be a specified duration after a first device has been authenticated and during which that first device has remained open and active. In yet another preferred embodiment, an authentication application on the first device is authenticated and must remain open to receive the login request. The authentication application, once authenticated, is granted a time-limited session by the authentication server. If there is no active session, for example if the session times out, the authentication application cannot receive login requests. The operating system of device itself may also contain the portion authentication application needed to authenticate the device and retain an active authentication session. Additionally, the active authentication session may be entirely time based and the device may be allowed to enter sleep mode after authentication and still receive login request notifications and be able to accept or deny login requests until the authentication session times out.

In yet another preferred embodiment, an authentication server receives a login request by a second device. The login attempt carries information that associates it to a first device previously registered with the authentication server. The information that associates the login attempt with a previously registered device may be one of an email address, username, password, transaction identifier, device identifiers such as serial numbers, device personality identifiers such as those specified in patent applications U.S. patent application Ser. Nos. 14/778,131, 14/889,383, 14/385,742, 14/432,542, and PCT Application PCT/US2015/1 1330 inclusive of their children, and other identifiers that are known in the art. When the authentication server receives a login request, it looks for an active authentication sessions associated with a previously registered device tied to the identifier received with the login request. In one example, a login request may contain an email address which is used by the authentication server to check if there is an active authentication session by the device previously associated with that email address. If there is a device in the authentication server associated with that email address but it does not have an active authentication session, then the authentication server does not send out a login confirmation notification to the first device. It also does not create a pending login request, where a first device may query for any pending login requests. Instead it does not consider the login request to be valid and does not allow the login request to be confirmed at all, thus denying the login attempt altogether.

In still yet another preferred embodiment, the authentication application and a second device must be within a certain specified proximity in order to send or receive login notifications and requests. In one example, a first device which has been authenticated and for which the current location of the device is known through GPS coordinates can only receive a login confirmation notification from an authentication server if the GPS coordinates are within a certain distance from a specified location of a second device. For example, the first device and the second device may need to be within the same country. In another example of this embodiment, the authentication server may not consider a login request as valid if the first device and second device are not within a specified distance from each other. In this instance, the first device may not be authenticated, but its location may still be known by the authentication server. Additionally, the location of the first device may only be considered if it has an active authentication session on an authentication server to which it has been previously registered. If it does not have an active authentication session, then the login request is considered invalid.

In still yet another preferred embodiment the first and the second device may be the same device. The login request and login confirmation may occur on the same device. In summary, a method and system is provided such that a push notification during an authentication procedure is only received if the device and user are authenticated prior to receiving the push notification. Either the device itself or the server sending the notification may be programmed to either reject or not forward the authentication request. Additionally, using the method of the present invention, security may be enhanced by requiring the location of the mobile device and the second device be approximately in the same geographical location. For example, its IP address and the device might determine a PC location by GPS data. The area allowed might be several miles but would prevent foreign attacks that are common in the world today.

Various modifications to these embodiments will be readily apparent to those skilled in the art without departing from the spirit or scope of the invention. Thus, the present invention is not intended to be limited to the embodiments shown herein but is to be accorded the widest scope consistent with the principles and novel features disclosed herein.

What is claimed is:

1. A multi-factor authentication method for confirming an identity of a user in possession of a mobile device, comprising:
   initially authenticating the mobile device for receiving a push notification as part of a multi-factor authentication process;
   receiving an authentication request of the user in possession of the mobile device receiving the push notification;

using an authentication program on the mobile device, determining the mobile device is authenticated and the authentication program remains open;

sending the push notification with an authentication code to the mobile device and the user by an authentication server only when the mobile device is authenticated and remains open;

determining whether an authentication session exists for the mobile device and an authentication session activity status is still active between the mobile device and the authentication server before sending the push notification, wherein determining whether an authentication session exists comprises determining whether the authentication program was launched on the mobile device, and the authentication session activity status is still active comprises determining that the authentication program is still active on the mobile device at the time the push notification is sent by the authentication server, wherein the authentication server is configured to not send the push notification when the authentication program on the mobile device has not been authenticated and open at the time of receiving the authentication request; and authenticating the user after receiving an input with the authentication code in response to the push notification to the mobile device.

2. The multi-factor authentication method according to claim 1, wherein the authentication server sending the push notification is programmed to reject the authentication request if receiving the authentication request comprises receiving two authentication requests from different devices.

3. The multi-factor authentication method according to claim 1, further comprising determining that a first location of the mobile device and a second location of a second device are in a same geographical location before sending the push notification, and the second device is used to authenticate the user in possession of the mobile device.

4. A multi-factor authentication method for confirming an identity of a user in possession of a mobile device, comprising:

initially authenticating a first device for receiving a push notification, wherein the first device is the mobile device;

initiating a login request through a second device;

sending the login request to an authentication server;

activating a current authentication session from the first device by launching an authentication program on the first device;

determining whether the first device is authenticated and has the current authentication session active, an activity of the current authentication session is between the first device and the authentication server for a specified duration after the first device has been authenticated through the authentication program on the first device;

sending a login confirmation request through the push notification to the first device and the user by the authentication server only when the first device and user are authenticated and has the current authentication session active, and terminating a pending login request and not sending the push notification to the first device and the user by the authentication server when the authentication program on the first device has not been authenticated and open at the time of sending the login confirmation request to the first device and the first device does not have the current authentication session active; and authenticating the user after receiving an input in response to the push notification to the first device.

5. The multi-factor authentication method of claim 4, further comprising confirming the first device and user are authenticated and has the current authentication session active; sending the push notification to the first device and the user by the authentication server while the first device and user are authenticated and has the current authentication session active; and granting access to a first application on the second device when the user confirms authentication from the first device in response to the push notification.

6. The multi-factor authentication method of claim 5, further comprising determining a distance proximity between the first device and the second device before sending the push notification to the first device.

7. The multi-factor authentication method of claim 5, wherein the second device and the first device are the same device.

8. The multi-factor authentication method of claim 5, wherein the authentication server is configured to not send the push notification when the user and first device are not authenticated.

9. The multi-factor authentication method of claim 8, wherein the current authentication session is inactive and the server does not send the push notification to the first device and the user.

10. The multi-factor authentication method of claim 8, wherein the authentication server denies a login attempt and does not allow the login request to be confirmed.

11. The multi-factor authentication method according to claim 4, wherein the authentication server does not send out a login confirmation notification to the first device if the current authentication session is not active.

12. The multi-factor authentication method according to claim 5, wherein the first device is a mobile device.

13. The multi-factor authentication method according to claim 12, wherein said first and said second device are the same device.

14. The multi-factor authentication method according to claim 5, wherein the authentication server receives the login request by the second device and the login attempt carries information that associates the login attempt to the first device previously registered with said authentication server.

15. The multi-factor authentication method of claim 1, wherein determining whether the authentication session is still active comprises determining that the authentication program was launched within a predetermined time limit.

16. The multi-factor authentication method of claim 1, wherein determining whether an authentication session exists comprises authenticating the first device, and determining whether an authentication session is active comprises determining that the first device remains open and active.

17. The multi-factor authentication method of claim 4, wherein determining whether the current authentication session is active comprises determining whether the authentication program was launched on the first device and is still open on the first device before sending the push notification, and further comprising sending the push notification based on the determination.

18. The multi-factor authentication method of claim 5, wherein activating a current authentication session comprises authenticating the first device, and determining whether the current authentication session is active comprises determining that the first device remains open and active.

19. The multi-factor authentication method of claim 5, wherein activating a current authentication session comprises launching the authentication program on the first device by a second authentication of the user through the authentication program with the authentication server separate from the initial authentication of the first device.

20. A multi-factor authentication method for confirming an identity of a user in possession of a mobile device, comprising:

initially authenticating a first device for receiving a push notification, wherein the first device is the mobile device;

initiating a login request through a second device;

sending the login request to an authentication server;

activating a current authentication session from the first device by launching and authenticating an authentication program on the first device;

determining whether the first device is authenticated and has the current authentication session active, an activity of the current authentication session is between the first device and the authentication server for a specified duration after the first device has been authenticated through the authentication program on the first device and while the first device remains open and the authentication program remains open;

sending a login confirmation request through the push notification to the first device by the authentication server only when the first device is authenticated and has the current authentication session active, and terminating the login request and not sending the push notification to the first device by the authentication server when the authentication program on the first device has not been authenticated and open at the time of sending the login confirmation request to the first device and the first device does not have the current authentication session active before sending the login request to the authentication server; and authenticating the user and authorizing the login request after receiving an input in response to the push notification on the first device.

\* \* \* \* \*